United States Patent
Elshafie et al.

(10) Patent No.: US 12,464,455 B2
(45) Date of Patent: Nov. 4, 2025

(54) COMMUNICATIONS IN POWER SAVING MODE

(71) Applicant: QUALCOMM Incorporated, San Diego, CA (US)

(72) Inventors: Ahmed Elshafie, San Diego, CA (US); Muhammad Sayed Khairy Abdelghaffar, San Jose, CA (US); Ahmed Attia Abotabl, San Diego, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 359 days.

(21) Appl. No.: 17/644,218

(22) Filed: Dec. 14, 2021

(65) Prior Publication Data

US 2023/0189141 A1   Jun. 15, 2023

(51) Int. Cl.
*H04W 52/02*   (2009.01)
*H04L 5/00*   (2006.01)
*H04W 72/0446*   (2023.01)
*H04W 72/23*   (2023.01)
(Continued)

(52) U.S. Cl.
CPC ....... *H04W 52/0212* (2013.01); *H04L 5/0048* (2013.01); *H04W 72/0446* (2013.01); *H04W 72/23* (2023.01)

(58) Field of Classification Search
CPC ......... H04W 52/0212; H04W 72/0446; H04W 72/23; H04W 52/0206; H04L 5/0048; H04L 1/08; H04L 5/0053; H04L 52/0216; H04L 52/0235; H04L 72/0453; H04L 72/11; H04L 72/232; Y02D 30/70
(Continued)

(56) References Cited

U.S. PATENT DOCUMENTS

2020/0100179 A1*   3/2020   Zhou ................. H04W 52/0216
2021/0099956 A1*   4/2021   Nam ................. H04W 52/0235
(Continued)

FOREIGN PATENT DOCUMENTS

WO   WO-2020064770 A1   4/2020
WO   WO-2021133705 A1   7/2021

OTHER PUBLICATIONS

International Search Report and Written Opinion—PCT/US2022/080319—ISA/EPO—Apr. 28, 2023.
(Continued)

*Primary Examiner* — Michael Y Mapa
(74) *Attorney, Agent, or Firm* — Kevin M. Donnelly; Harrity & Harrity, LLP

(57) ABSTRACT

Various aspects of the present disclosure generally relate to wireless communication. In some aspects, a user equipment (UE) may receive an indication of a power saving mode of a base station. The UE may communicate with the base station using one or more communication parameters that are based at least in part on the power saving mode, the one or more communication parameters comprising one or more of: a physical downlink shared channel configuration, a downlink control information configuration, a demodulation reference signal configuration, a transport block size configuration, a block error rate configuration, or a layer configuration. Numerous other aspects are provided.

30 Claims, 8 Drawing Sheets

(58) Field of Classification Search
USPC .................... 370/311; 455/127.5, 343.1, 574
See application file for complete search history.

(56) References Cited

U.S. PATENT DOCUMENTS

| | | |
|---|---|---|
| 2021/0195523 A1 | 6/2021 | Kim et al. |
| 2021/0242913 A1* | 8/2021 | Manolakos ............ H04L 5/0091 |
| 2021/0329556 A1* | 10/2021 | Kim .................. H04W 52/0229 |
| 2021/0352654 A1 | 11/2021 | Ai et al. |

OTHER PUBLICATIONS

Oppo: "Email Report of [AT109e][046][DCCA] Fast SCell Activation (Oppo)", 3GPP TSG-RAN WG2 Meeting #109 electronic, R2-2002224, 3rd Generation Partnership Project (3GPP), Mobile Competence Centre, 650, Route Des Lucioles, F-06921, Sophia-Antipolis Cedex, France, vol. RAN WG2, No. Feb. 24, 2020-Mar. 6, 2020, Mar. 11, 2020, pp. 1-31, XP051864757, Agreements: For the case when PDCCCH with DCI format 1-1 is used for indicating dormancy of SCells, p. 30.

Qualcomm Incorporated: "Fast SCG and SCell Activation", 3GPP TSG-RAN WG1 #98, R1-1909287, 3GPP, Mobile Competence Centre, 650, Route Des Lucioles, F-06921, Sophia-Antipolis Cedex, France, vol. RAN WG1, No. Prague, Czech Republic, Aug. 26, 2019-Aug. 30, 2019, Aug. 17, 2019, pp. 1-11, XP051765892, 2.1 Fast SCell Activation/ Deactivation, 2.2 SCell Dormancy, 2.3 Usage of fast SCell activation and dormant BWP.

Partial International Search Report—PCT/US2022/080319—ISA/EPO—Mar. 3, 2023.

\* cited by examiner

COMMUNICATIONS IN POWER SAVING MODE

FIELD OF THE DISCLOSURE

Aspects of the present disclosure generally relate to wireless communication and specifically, to techniques and apparatuses for communicating while in a power saving mode.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different UEs to communicate on a municipal, national, regional, or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

In some networks, network devices such as base stations may manage wireless communications using an unnecessary amount of power consumption. In some networks, the network devices may have power constraints that limit an amount of power resources available to the network devices to manage the wireless communications. The network devices may support changing communication parameters that are associated with different power consumption rates based at least in part on power constraints or a determination that power consumption can be reduced while managing current wireless communications, among other examples. A base station may indicate, to a UE, values of the communication parameters to apply to a subsequent communication based at least in part on a power consumption rate. However, indicating the values for the communication parameters consumes communication, computing, network, or power resources of the UE or the base station. Additionally or alternatively, dynamic signaling, such as a downlink control information message, may have limited information fields for carrying the values for the communication parameters for the subsequent communication. In this way, the base station may be unable to realize potential power saving that the base station may otherwise support.

SUMMARY

Some aspects described herein relate to a method of wireless communication performed by a user equipment (UE). The method may include receiving an indication of a power saving mode of a base station. The method may include communicating with the base station using one or more communication parameters that are based at least in part on the power saving mode, the one or more communication parameters comprising one or more of: a physical downlink shared channel (PDSCH) configuration that is based at least in part on the power saving mode, a downlink control information (DCI) configuration that is based at least in part on the power saving mode, a demodulation reference signal (DMRS) configuration that is based at least in part on the power saving mode, a transport block size (TBS) configuration that is based at least in part on the power saving mode, a block error rate (BLER) configuration that is based at least in part on the power saving mode, or a layer configuration that is based at least in part on the power saving mode.

Some aspects described herein relate to a method of wireless communication performed by a base station. The method may include transmitting an indication of a power saving mode of the base station. The method may include communicating with a UE using one or more communication parameters that are based at least in part on the power saving mode, the one or more communication parameters comprising one or more of: a PDSCH configuration that is based at least in part on the power saving mode, a DCI configuration that is based at least in part on the power saving mode, a DMRS configuration that is based at least in part on the power saving mode, a TBS configuration that is based at least in part on the power saving mode, a BLER configuration that is based at least in part on the power saving mode, or a layer configuration that is based at least in part on the power saving mode.

Some aspects described herein relate to a UE for wireless communication. The user equipment may include at least one processor and at least one memory, communicatively coupled with the at least one processor, that stores processor-readable code. The processor-readable code, when executed by the at least one processor, may be configured to cause the user equipment to receive an indication of a power saving mode of a base station. The processor-readable code, when executed by the at least one processor, may be configured to cause the user equipment to communicate with the base station using one or more communication parameters that are based at least in part on the power saving mode, the one or more communication parameters comprising one or more of: a PDSCH configuration that is based at least in part on the power saving mode, a DCI configuration that is based at least in part on the power saving mode, a DMRS configuration that is based at least in part on the power saving mode, a TBS configuration that is based at least in part on the power saving mode, a BLER configuration that is based at least in part on the power saving mode, or a layer configuration that is based at least in part on the power saving mode.

Some aspects described herein relate to a base station for wireless communication. The base station may include at least one processor and at least one memory, communicatively coupled with the at least one processor, that stores processor-readable code. The processor-readable code, when executed by the at least one processor, may be configured to cause the base station to transmit an indication of a power saving mode of the base station. The processor-readable code, when executed by the at least one processor, may be configured to cause the base station to communicate with a UE using one or more communication parameters that are based at least in part on the power saving mode, the one or more communication parameters comprising one or more of: a PDSCH configuration that is based at least in part on the power saving mode, a DCI configuration that is based at least in part on the power saving mode, a DMRS configuration that is based at least in part on the power saving mode, a TBS configuration that is based at least in part on the power saving mode, a BLER configuration that is based at least in part on the power saving mode, or a layer configuration that is based at least in part on the power saving mode.

Some aspects described herein relate to a non-transitory computer-readable medium that stores a set of instructions for wireless communication by a UE. The set of instructions, when executed by one or more processors of the UE, may cause the UE to receive an indication of a power saving mode of a base station. The set of instructions, when executed by one or more processors of the UE, may cause the UE to communicate with the base station using one or more communication parameters that are based at least in part on the power saving mode, the one or more communication parameters comprising one or more of: a PDSCH configuration that is based at least in part on the power saving mode, a DCI configuration that is based at least in part on the power saving mode, a DMRS configuration that is based at least in part on the power saving mode, a TBS configuration that is based at least in part on the power saving mode, a BLER configuration that is based at least in part on the power saving mode, or a layer configuration that is based at least in part on the power saving mode.

Some aspects described herein relate to a non-transitory computer-readable medium that stores a set of instructions for wireless communication by a base station. The set of instructions, when executed by one or more processors of the base station, may cause the base station to transmit an indication of a power saving mode of the base station. The set of instructions, when executed by one or more processors of the base station, may cause the base station to communicate with a UE using one or more communication parameters that are based at least in part on the power saving mode, the one or more communication parameters comprising one or more of: a PDSCH configuration that is based at least in part on the power saving mode, a DCI configuration that is based at least in part on the power saving mode, a DMRS configuration that is based at least in part on the power saving mode, a TBS configuration that is based at least in part on the power saving mode, a BLER configuration that is based at least in part on the power saving mode, or a layer configuration that is based at least in part on the power saving mode.

Some aspects described herein relate to an apparatus for wireless communication. The apparatus may include means for receiving an indication of a power saving mode of a base station. The apparatus may include means for communicating with the base station using one or more communication parameters that are based at least in part on the power saving mode, the one or more communication parameters comprising one or more of: a PDSCH configuration that is based at least in part on the power saving mode, a DCI configuration that is based at least in part on the power saving mode, a DMRS configuration that is based at least in part on the power saving mode, a TBS configuration that is based at least in part on the power saving mode, a BLER configuration that is based at least in part on the power saving mode, or a layer configuration that is based at least in part on the power saving mode.

Some aspects described herein relate to an apparatus for wireless communication. The apparatus may include means for transmitting an indication of a power saving mode of the base station. The apparatus may include means for communicating with a UE using one or more communication parameters that are based at least in part on the power saving mode, the one or more communication parameters comprising one or more of: a PDSCH configuration that is based at least in part on the power saving mode, a DCI configuration that is based at least in part on the power saving mode, a DMRS configuration that is based at least in part on the power saving mode, a TBS configuration that is based at least in part on the power saving mode, a BLER configuration that is based at least in part on the power saving mode, or a layer configuration that is based at least in part on the power saving mode.

Aspects generally include a method, apparatus, system, computer program product, non-transitory computer-readable medium, user equipment, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
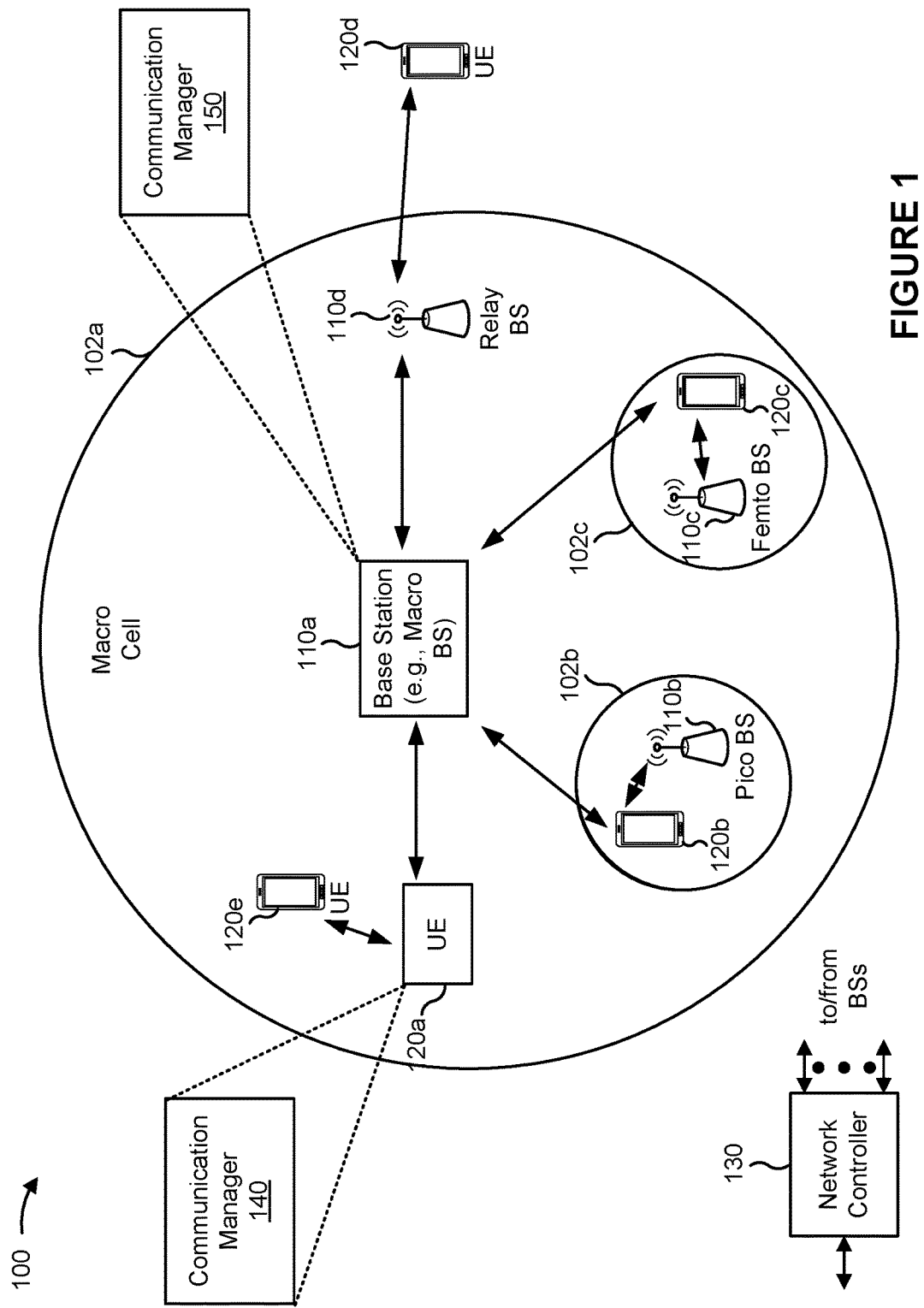
FIG. 1 is a diagram illustrating an example of a wireless network in accordance with the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to communicating while in a power saving mode. Some aspects more specifically relate to a base station indicating a power saving mode to a user equipment (UE), and the base station and the UE each applying communication parameters (based at least in part on the power saving mode) that are associated with a power saving configuration. The communication parameters that are based at least in part on the power saving mode may include a physical downlink shared channel (PDSCH) configuration, a downlink control information (DCI) configuration, a demodulation reference signal (DMRS) configuration, a transport block size (TBS) configuration, a block error rate (BLER) configuration, or a layer configuration, among other examples. In some aspects, the base station may transmit an indication of a set of candidate power saving modes and associated configurations, with the configurations indicating the communication parameters associated with the candidate power saving modes. In this way, an indication of the power saving mode may indicate a set of communication parameters without an explicit indication (for example, a dynamic indication) of each of the communication parameters. Similarly, an indication of a change to the power saving mode (for example, an indication of a selection of a different candidate power saving mode) may indicate a change to the set of communication parameters without an explicit indication of changes to each of the communication parameters.

Particular aspects of the subject matter described in this disclosure can be implemented to realize one or more of the following potential advantages. In some examples, the described techniques can be used to conserve power resources based at least in part on the base station operating in a power saving mode, and to conserve network communication, power, or computing resources that may have otherwise been used to indicate values of the communication parameters.

FIG. 1 is a diagram illustrating an example of a wireless network in accordance with the present disclosure. The wireless network 100 may be or may include elements of a 5G (for example, NR) network or a 4G (for example, Long Term Evolution (LTE)) network, among other examples. The wireless network 100 may include one or more base stations 110 (shown as a BS 110*a*, a BS 110*b*, a BS 110*c*, and a BS 110*d*), a UE 120 or multiple UEs 120 (shown as a UE 120*a*, a UE 120*b*, a UE 120*c*, a UE 120*d*, and a UE 120*e*), or other network entities. A base station 110 is an entity that communicates with UEs 120. A base station 110 (sometimes referred to as a BS) may include, for example, an NR base station, an LTE base station, a Node B, an eNB (for example, in 4G), a gNB (for example, in 5G), an access point, or a transmission reception point (TRP). Each base station 110 may provide communication coverage for a particular geographic area. In the Third Generation Partnership Project (3GPP), the term "cell" can refer to a coverage area of a base station 110 or a base station subsystem serving this coverage area, depending on the context in which the term is used.

A base station 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station.

The wireless network 100 may be a heterogeneous network that includes base stations 110 of different types, such as macro base stations, pico base stations, femto base stations, or relay base stations. These different types of base stations 110 may have different transmit power levels, different coverage areas, or different impacts on interference in the wireless network 100. For example, macro base stations may have a high transmit power level (for example, 5 to 40 watts) whereas pico base stations, femto base stations, and relay base stations may have lower transmit power levels (for example, 0.1 to 2 watts). In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102c. A base station may support one or multiple (for example, three) cells. A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

In some examples, a cell may not necessarily be stationary, and the geographic area of the cell may move in accordance with the location of a base station 110 that is mobile (for example, a mobile base station). In some examples, the base stations 110 may be interconnected to one another or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a base station 110 or a UE 120) and send a transmission of the data to a downstream station (for example, a UE 120 or a base station 110). A relay station may be a UE 120 that can relay transmissions for other UEs 120. In the example shown in FIG. 1, the BS 110d (for example, a relay base station) may communicate with the BS 110a (for example, a macro base station) and the UE 120d in order to facilitate communication between the BS 110a and the UE 120d. A base station 110 that relays communications may be referred to as a relay station, a relay base station, or a relay.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, or any other suitable device that is configured to communicate via a wireless medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a base station, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any quantity of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120e) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the base station 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs in connection with FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz," if used herein, may broadly represent frequencies that may be less than 6 GHz, may be within FR1, or may include mid-band frequencies. Further, unless specifically stated otherwise, it should be understood that the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may receive an indication of a power saving mode of a base station; and communicate with the base station using one or more communication parameters that are based at least in part on the power saving mode, the one or more communication parameters comprising one or more of: a PDSCH configuration that is based at least in part on the power saving mode, a DCI configuration that is based at least in part on the power saving mode, a DMRS configuration that is based at least in part on the power saving mode, a TBS configuration that is based at least in part on the power saving mode, a BLER configuration that is based at least in part on the power saving mode, or a layer configuration that is based at least in part on the power saving mode. Additionally or alternatively, the communication manager 140 may perform one or more other operations described herein.

In some aspects, the base station 110 may include a communication manager 150. As described in more detail elsewhere herein, the communication manager 150 may transmit an indication of a power saving mode of the base station; and communicate with a UE using one or more communication parameters that are based at least in part on the power saving mode, the one or more communication parameters comprising one or more of: a PDSCH configuration that is based at least in part on the power saving mode, a DCI configuration that is based at least in part on the power saving mode, a DMRS configuration that is based at least in part on the power saving mode, a TBS configuration that is based at least in part on the power saving mode, a BLER configuration that is based at least in part on the power saving mode, or a layer configuration that is based at least in part on the power saving mode. Additionally or alternatively, the communication manager 150 may perform one or more other operations described herein.

Figure 2:
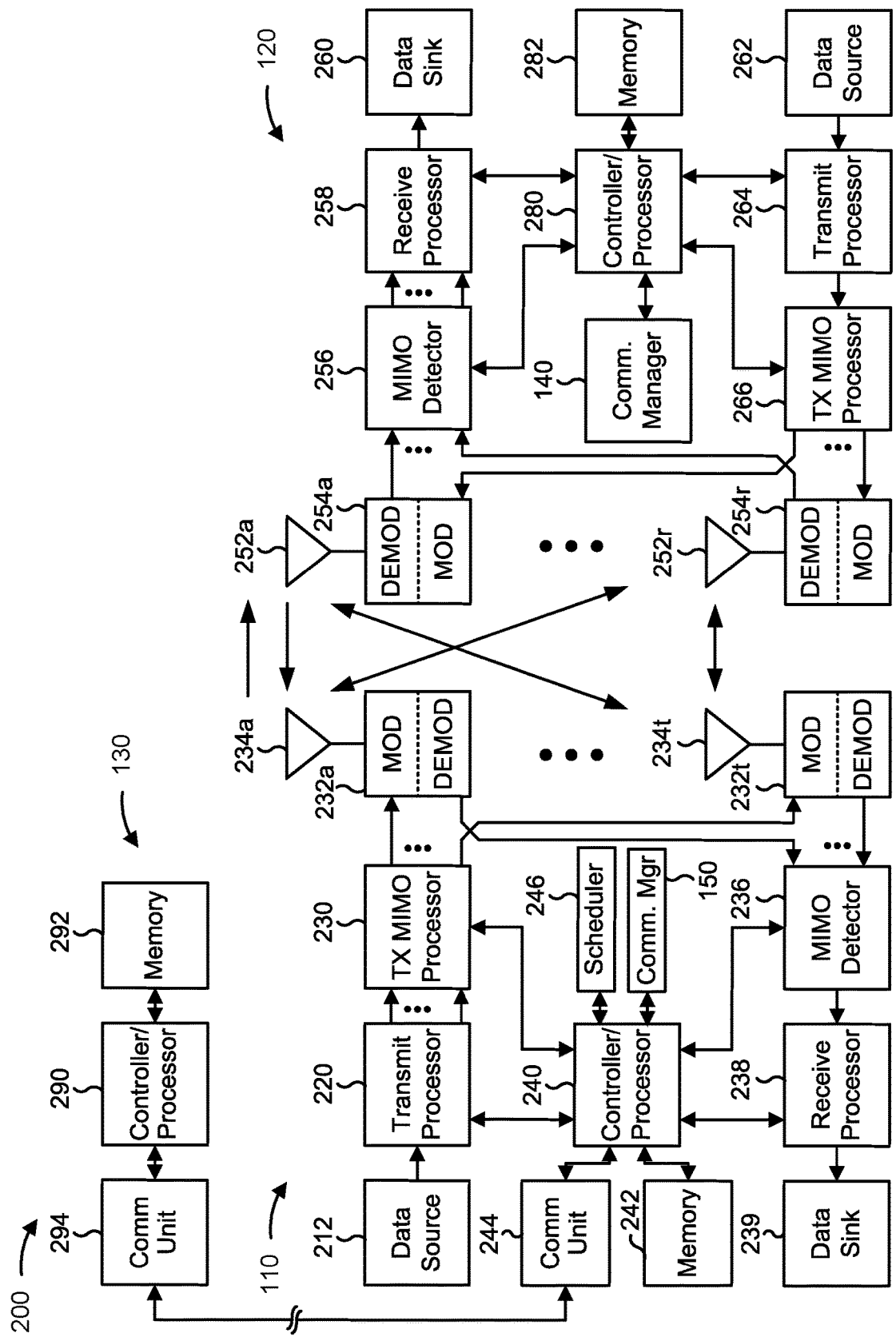
FIG. 2 is a diagram illustrating an example base station in communication with a user equipment (UE) in a wireless network in accordance with the present disclosure.

FIG. 2 is a diagram illustrating an example base station in communication with a UE in a wireless network in accordance with the present disclosure. The base station may correspond to the base station 110 of FIG. 1. Similarly, the UE may correspond to the UE 120 of FIG. 1. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (for example, encode and modulate) the data for the UE 120 based at least in part on the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a DMRS) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the base station 110 or other base stations 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the methods described herein.

At the base station 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the methods described herein.

The controller/processor 240 of the base station 110, the controller/processor 280 of the UE 120, or any other component(s) of FIG. 2 may perform one or more techniques associated with communicating while in a power saving mode, as described in more detail elsewhere herein. For example, the controller/processor 240 of the base station 110, the controller/processor 280 of the UE 120, or any other component(s) of FIG. 2 may perform or direct operations of, for example, process 500 of FIG. 5, process 600 of FIG. 6, or other processes as described herein. The memory 242 and the memory 282 may store data and program codes for the base station 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the base station 110 or the UE 120, may cause the one or more processors, the UE 120, or the base station 110 to perform or direct operations of, for example, process 500 of FIG. 5, process 600 of FIG. 6, or other processes as described herein. In some examples, executing instructions may include running the instructions, converting the instructions, compiling the instructions, or interpreting the instructions, among other examples.

In some aspects, the UE includes means for receiving an indication of a power saving mode of a base station; or means for communicating with the base station using one or more communication parameters that are based at least in part on the power saving mode, the one or more communication parameters comprising one or more of: a PDSCH configuration that is based at least in part on the power saving mode, a DCI configuration that is based at least in part on the power saving mode, a DMRS configuration that is based at least in part on the power saving mode, a TBS configuration that is based at least in part on the power saving mode, a BLER configuration that is based at least in part on the power saving mode, or a layer configuration that is based at least in part on the power saving mode. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for transmitting an indication of a power saving mode of the base station; or means for communicating with a UE using one or more communication parameters that are based at least in part on the power saving mode, the one or more communication parameters comprising one or more of: a PDSCH configuration that is based at least in part on the power saving mode, a DCI configuration that is based at least in part on the power saving mode, a DMRS configuration that is based at least in part on the power saving mode, a TBS configuration that is based at least in part on the power saving mode, a BLER configuration that is based at least in part on the power saving mode, or a layer configuration that is based at least in part on the power saving mode. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

Figure 3:
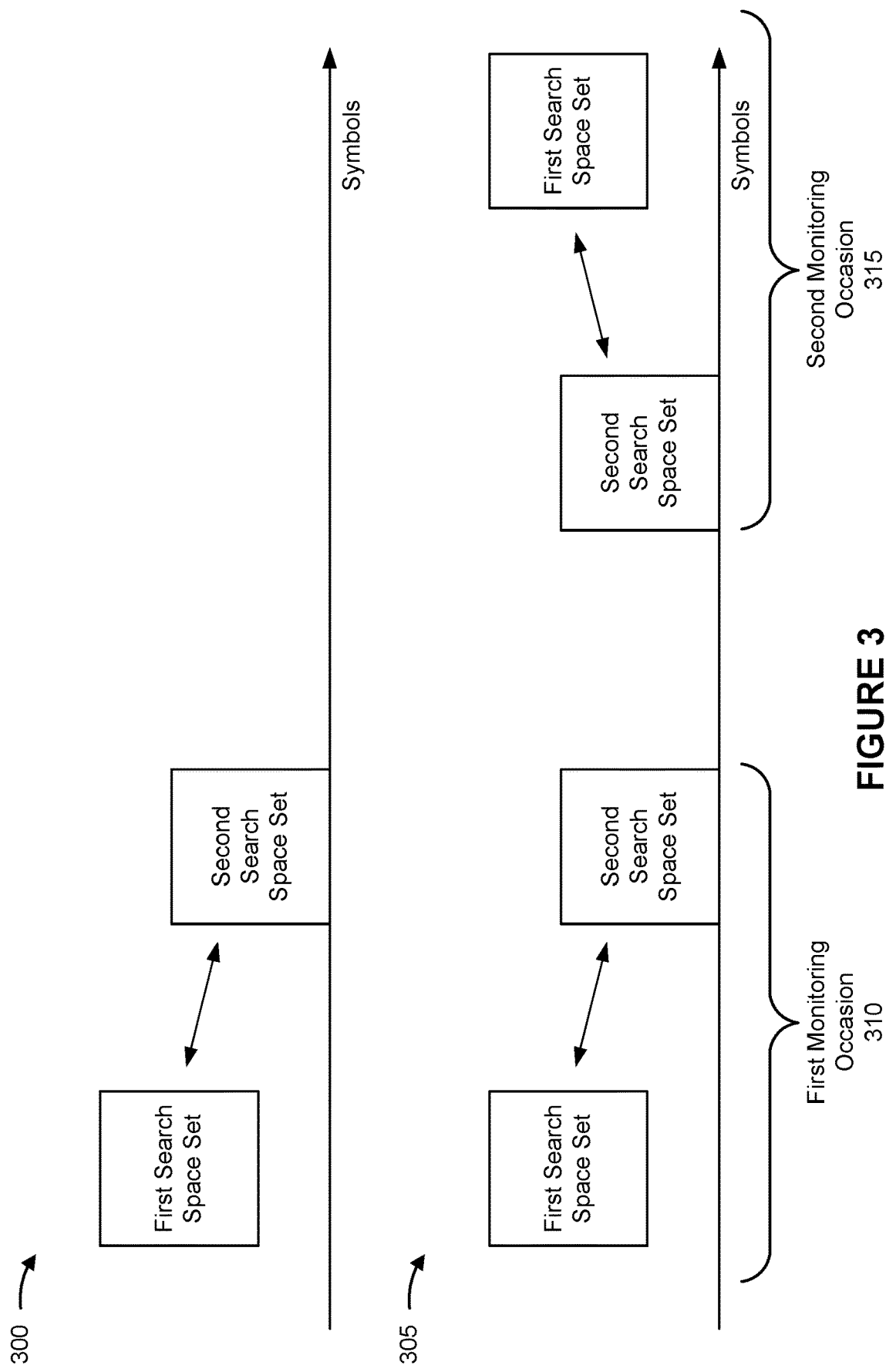
FIG. 3 is a diagram illustrating an example of control channel repetitions in accordance with the present disclosure.

FIG. 3 is a diagram illustrating an example of control channel repetitions in accordance with the present disclosure. In some networks, a base station may schedule a physical downlink control channel (PDCCH) communication or a PDSCH with repetitions to improve coverage of a transmission signal. The repetitions may be configured to carry a same message over different communication resources (for example, in time or frequency). A receiving device may combine samplings over the different communication resources to improve demodulation or decoding of the PDCCH communication or the PDSCH communication.

A UE may be configured with multiple (for example, up to 3 or up to 5) control resource sets (CORESETs) in a bandwidth part (BWP) of a serving cell (for example, a component carrier (CC)). Each CORESET may be associated with one active transmission configuration indication (TCI) state. A CORESET configuration may indicate or configure resources (for example, resource blocks) of a CORESET in a frequency domain, or a quantity of symbols of the CORESET (for example, 1, 2, or 3 OFDM symbols), among other examples. Each search space set, for a receiving device to detect a control message (for example, DCI), is associated with one CORESET.

There may be multiple search space sets (for example, up to 10) in a BWP of the serving cell. A search space configuration may be configured via radio resource control (RRC) signaling. The search space configuration may indicate an associated CORESET, periodicity and offset for monitoring slots, monitoring symbols of the monitoring slots, an indication of PDCCH monitoring occasions (MOs) of the search space set, or a search space set type (for example, a common search space (CSS) or UE-specific search space (USS), among other examples). Additionally or alternatively, the search space configuration may indicate DCI formats to monitor or a quantity of PDCCH candidates for different aggregation levels (ALs), among other examples. PDCCH candidates may be defined as part of search space set configurations. For example, a search space set configuration may define an aggregation level and a candidate index for a PDCCH candidate.

The UE monitors PDCCH candidates in search space sets, and one or more PDSCH candidates that pass a cyclic redundancy check (CRC) (successful decoding) correspond to a decoded DCI (for example, using blind decoding). The UE may receive a DCI message within one PDCCH candidate.

In some networks, each repetition of a DCI message may be associated with a PDCCH candidate and multiple (for example, two) PDCCH candidates are linked together for repetition of the DCI message.

As shown by reference number 300, a link may be established between a first search space set associated with a first PDCCH candidate and a second search space set associated with a second PDCCH candidate. The first search space set and the second search space set may be scheduled within a single slot (for example, an intra-slot PDCCH repetition).

As shown by reference number 300, a link may be established between a first search space set associated with a first PDCCH candidate and a second search space set associated with a second PDCCH candidate. The first search space set and the second search space set may be scheduled within a single slot (for example, an intra-slot PDCCH repetition).

As shown by reference number 305, a link may be established, within a first monitoring occasion 310 between a first search space set associated with a first PDCCH candidate and a second search space set associated with a second PDCCH candidate. A second monitoring occasion 315 may also include the first search space set and the second search space set, and the search space sets may be linked (for example, for repetitions) across different slots associated with the different monitoring occasions 310, 315 (for example, an inter-slot PDCCH repetition).

The PDCCH candidates having repetitions of the DCI message may be configured with a same aggregation level having a same number of control channel elements, and the DCI message transmitted using the PDCCH candidates has a same payload. The UE may perform soft combining to decode the DCI message based at least in part on combining samples collected during the search space sets.

The base station may indicate a linking between the PDCCH candidates using, for example, RRC signaling. The base station may indicate the linking based at least in part on providing a one-to-one mapping of the search space sets. Additionally or alternatively, PDCCH candidates with a same AL and same candidate index in linked search space sets may be indicated as being linked. For example, two linked search space sets may be configured with a same quantity of candidates for each AL. In this way, the UE knows the linking before attempting to decode the DCI message.

Repetitions of DCI messages or PDSCH messages may improve coverage for communications between the UE and the base station. However, using repetitions may consume increased power resources to transmit or receive and combine the repetitions relative to single transmission of the DCI messages or PDSCH message. Additionally or alternatively, other communication parameters may affect consumption of power resources, such as a PDSCH configuration, a DCI configuration, a DMRS configuration, a TBS configuration, a BLER configuration, or a layer configuration, among other examples. To configure the communication parameters for power saving, the base station may transmit indications of values for the communication parameters. However, indicating the values for the parameters consumes communication, computing, network, or power resources of the UE or the base station. Additionally or alternatively, dynamic signaling, such as a DCI message, may have limited information fields for carrying the values for the subsequent communication parameters. In this way, the base station may be unable to realize potential power saving that the base station may otherwise support.

Various aspects relate generally to communicating while in a power saving mode. Some aspects more specifically relate to a base station indicating a power saving mode to a UE, and the base station and the UE each applying communication parameters (based at least in part on the power saving mode) that are associated with a power saving configuration. The communication parameters that are based at least in part on the power saving mode may include a PDSCH configuration, a DCI configuration, a DMRS configuration, a TBS configuration, a BLER configuration, or a layer configuration, among other examples. In some aspects, the base station may transmit an indication of a set of candidate power saving modes and associated configurations, with the configurations indicating the communication parameters associated with the candidate power saving modes. In this way, an indication of the power saving mode may indicate a set of communication parameters without an explicit indication (for example, a dynamic indication) of each of the communication parameters. Similarly, an indication of a change to the power saving mode (for example, an indication of a selection of a different candidate power saving mode) may indicate a change to the set of communication parameters without an explicit indication of changes to each of the communication parameters.

Particular aspects of the subject matter described in this disclosure can be implemented to realize one or more of the following potential advantages. In some examples, the described techniques can be used to conserve power resources based at least in part on the base station operating in a power saving mode, and to conserve network communication, power, or computing resources that may have otherwise been used to indicate values of the communication parameters.

Figure 4:
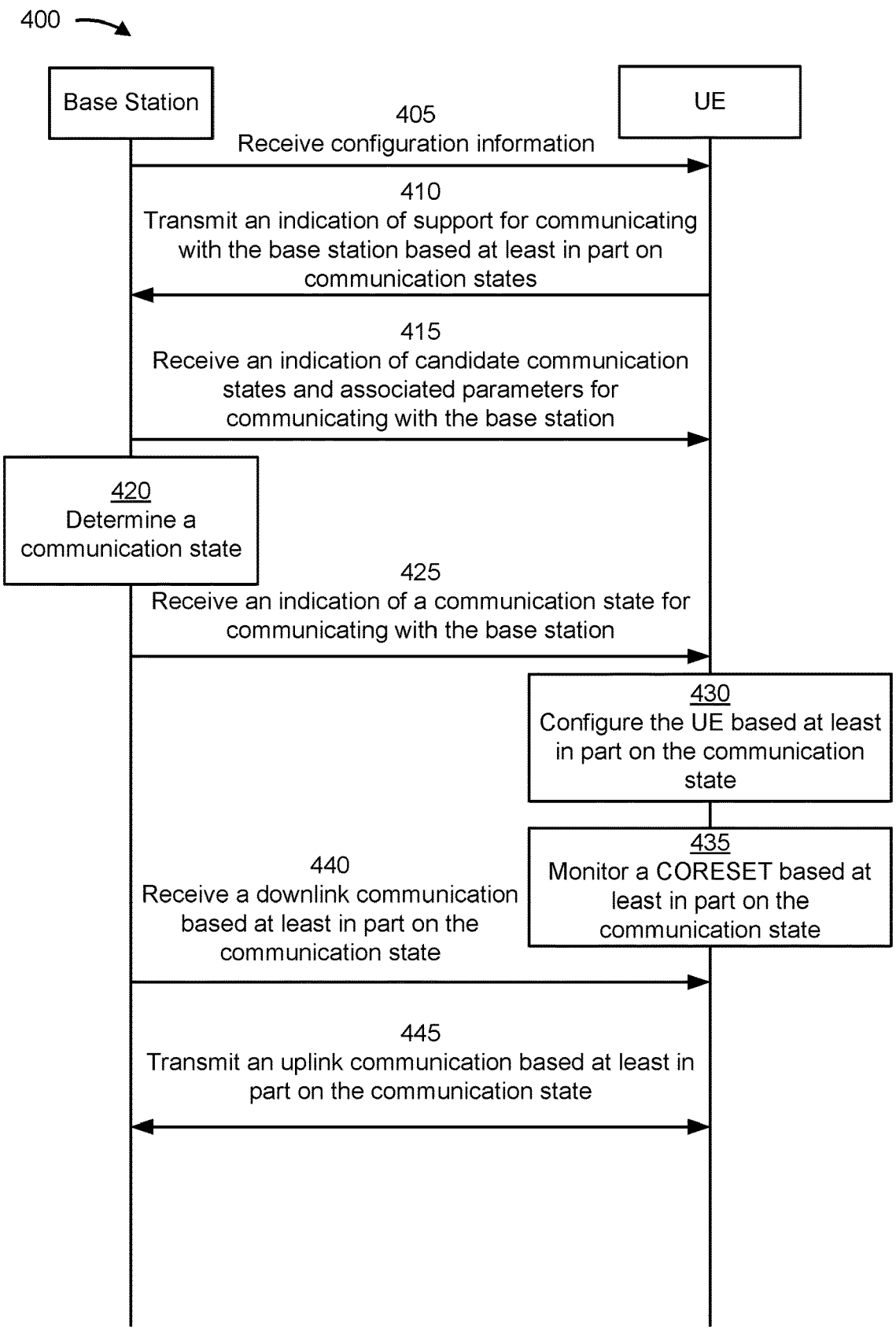
FIG. 4 is a diagram illustrating an example associated with communicating while in a power saving mode in accordance with the present disclosure.

FIG. 4 is a diagram illustrating an example 400 associated with communicating while in a power saving mode, in accordance with the present disclosure. As shown in FIG. 4, a base station (for example, base station 110) may communicate with a UE (for example, UE 120). In some aspects, the base station and the UE may be part of a wireless network (for example, wireless network 100). The UE and the base station may have established a wireless connection prior to operations shown in FIG. 4.

In a first operation 405, the base station may transmit, and the UE may receive, configuration information. In some aspects, the UE may receive the configuration information via one or more of RRC signaling, one or more medium access control (MAC) control elements (CEs), or DCI, among other examples. In some aspects, the configuration information may include an indication of one or more configuration parameters (for example, already known to the UE) for selection by the UE, or explicit configuration information for the UE to use to configure the UE, among other examples.

In some aspects, the configuration information may indicate that the UE is to transmit an indication of support for communicating with the base station based at least in part on communication states, such as a power saving mode of the base station. In some aspects, the configuration information may indicate that the base station is to transmit, and the UE is to receive, an indication of a set of candidate communication states and associated parameters for communicating with the base station. For example, the configuration information may indicate that the UE is to apply a configuration for a PDSCH, DCI, DMRSs, a TBS, a BLER, or layers, among other examples, based at least in part on an active power saving mode as indicated by the base station.

The UE may configure itself based at least in part on the configuration information. In some aspects, the UE may be configured to perform one or more operations described herein based at least in part on the configuration information.

In a second operation 410, the UE may transmit, and the base station may receive, an indication of support for communicating with the base station based at least in part on communication states. In some aspects, the UE may transmit the indication of support before receiving a portion of the configuration information described in connection with the first operation 405. For example, the UE may receive a first portion of the configuration information that indicates that the UE is to transmit the indication of support and may receive a second portion of the configuration information that indicates a configuration for communication with the base station based on the communication states or power saving modes of the base station.

In a third operation 415, the UE may receive, and the base station may transmit, an indication of candidate communication states and associated parameters for communicating with the base station. In some aspects, the indication of the candidate communication states, and associated parameters may indicate, a mapping of the candidate communication states to one or more communication parameters. For example, the communication parameters may include a PDSCH configuration, a DCI configuration, a DMRS configuration, a TBS configuration, a BLER configuration, or a layer configuration, among other examples. In some aspects, the one or more communication states may be associated with one or more power saving modes of the base station. For example, each of the one or more communication states may be mapped to a power saving mode (for example, with one-to-one mapping or multiple-to-one mapping).

In some aspects, the base station may transmit, and the UE may receive, an indication to associate the candidate communication states or power saving modes with one or more parameters for communicating with the base station. For example, the UE may receive an indication to associate the one or more power saving modes with different communication parameters associated with the PDSCH configuration, the DCI configuration, the DMRS configuration, the TBS configuration, the BLER configuration, or the layer configuration, among other examples.

In some aspects, the PDSCH configuration may include communication parameters such as a repetition number for communications with the base station or a change to the repetition number for the communications with the base station, among other examples. For example, the PDSCH configuration may indicate a repetition number reduction, a maximum repetition number, or a change from a previous PDSCH configuration. Different power saving modes or communication states may be associated with different a repetition number reduction, a maximum repetition number, or a change from a previous PDSCH configuration.

In some aspects, the PDSCH configuration may include communication parameters that may be associated with different semi-persistent-scheduling (SPS)-based communication sets For example, the PDSCH configuration may indicate one or more repetition numbers for one or more SPS-based communications with the base station or cancelation of repetitions for one or more SPS-based communications with the base station, among other examples.

In some aspects, the DCI configuration is associated with ALs and CORESETs per UE, resources of CORESETs in a frequency domain, or a quantity of symbols of the CORESET (for example, 1, 2, or 3 OFDM symbols), among other examples. In some aspects, the DCI configuration may be associated with a CORESET to use to monitor for receiving a DCI message, a quantity of time-based resources of the control resource set, a quantity of frequency-based resources of the control resource set, one or more candidate ALs for receiving the DCI message, a repetition number of the DCI message, disabling or canceling of repetitions of the DCI message, or a quantity of DCI messages transmitted in a multiple transmission reception point (multi-TRP) configuration, among other examples.

In some aspects, the DMRS configuration may be associated with an energy per resource element (EPRE) for transmitting DMRSs, a power offset between transmitting the DMRSs and transmitting data, replacement of one or more DMRS symbols with data symbols, frequency-domain density of the DMRSs, or activation or deactivation of DMRS bundling, among other examples. Based at least in part on deactivating DMRS bundling, the UE may be not be required to maintain phase continuity or operating power amplifiers, which may improve coverage or power consumption. In some aspects, an EPRE for the DMRS or a power offset for DMRS may change per power saving mode. Additionally or alternatively, since DMRSs may be configured for transmission with higher power than data, by switching to lower power mode, the DMRS may be transmitted with a same power as data of the PDSCH. In some aspects, some DMRS symbols may be canceled and replaced with data. In some aspects, frequency domain density of the DMRSs may be reduced for some power saving modes.

In some aspects, the communication parameters may include a tracking reference signal (TRS) configuration that is based at least in part on the power saving mode or a phase-tracking reference signal (PTRS) configuration that is based at least in part on the power saving mode, among other examples. For example, the TRS configuration or the PTRS configuration may be associated with cancelation of TRSs, cancelation of PTRSs, a time-domain pattern of TRSs, a time-domain pattern of PTRSs, a frequency-domain pattern of TRSs, or a frequency-domain pattern of PTRSs, among other examples.

In some aspects, the UE may use a fixed TBS or a threshold TBS that is based at least in part on the power saving mode. For example, the UE may use a fixed TBS or lower a maximum TBS to a limit that changes with, or is associated with, the energy saving mode.

In some aspects, the communication parameters indicate a number of symbols in a slot for communications with the base station, a number of symbols in a sub-slot for communications with the base station, a number of resource blocks in a slot for communications with the base station, or a number of resource blocks in a sub-slot for communications with the base station. For example, the communication parameters may indicate a limit for a number of OFDM symbols or resource blocks per sub-slot or per slot.

In some aspects, the BLER configuration is associated with a target BLER that is based at least in part on the power saving mode. In some aspects, the communication parameters comprise an MCS configuration that is based at least in part on the power saving mode. The MCS configuration may be associated with one or both of MCS tables or a maximum MCS that is based at least in part on the power saving mode. For example, the UE may use different target BLERs, MCS tables, or maximum MCSs for different energy saving modes. In some aspects, the base station may not support maintaining BLERs below a threshold BLER when operating in different power saving modes.

In some aspects, the communication parameters may include a re-transmission configuration that is based at least in part on the power saving mode. The re-transmission configuration may be associated with a maximum re-transmission number that is based at least in part on the power saving mode, a maximum transmission number that is based at least in part on the power saving mode, or a redundancy version (RV) sequence length that is based at least in part on the power saving mode, among other examples. For example, the UE and the base station may use a maximum number of re-transmissions or RV sequence length associated with an active power saving mode.

In some aspects, the layer configuration is associated with a first maximum layer number that is based at least in part on the power saving mode, a second maximum layer number associated with a serving cell, the second maximum layer number being based at least in part on the power saving mode, or one or more third maximum layer numbers associated with one or more bandwidth parts with the one or more third maximum layer numbers being based at least in part on the power saving mode, among other examples. For example, the layer configuration may indicate a maximum MIMO layer indication for a serving cell or for different BWPs depending on different power saving modes.

In a fourth operation 420, the base station may determine a communication state to use for communicating with the UE or additional UEs served in a cell provided by the base station. For example, the base station may determine to use a communication state associated with a power saving mode of the base station. The base station may determine to apply the power saving mode of the base station based at least in part on power constraints that limit an amount of power resources available to the base station to manage the wireless communications or a determination that power consumption can be reduced while managing current wireless communications, among other examples. In some aspects, the base station may determine the power saving mode based at least in part on a number of UEs connected with the base station, an amount of traffic handled by the base station, a type of traffic handled by the base station, channel conditions for channels between the base station and the UE, or communication channels for UEs connected with the base station, among other examples.

In a fifth operation 425, the UE may receive, and the base station may transmit, an indication of a communication state for communicating with the base station. In some aspects, the indication of the communication state may include an indication of a power saving mode of the base station. In some aspects, the indication of the communication state may indicate an active communication state from a set of candidate communication states (for example, as described in connection with the third operation 415). In some aspects, the UE may receive the indication of the power saving mode via an explicit indication or via an indication of a change of the power saving mode relative to another power saving mode of the base station (for example, an indication to reduce or increase power from the other power saving mode). For example, the indication of the communication state may include an update from a previously active communication state.

In some aspects, the UE may receive, in connection with or separately from the indication of the communication state, an indication of one or more component carrier power saving modes for one or more component carriers configured for communication between the UE and the base station. In some aspects, the UE may apply levels of power saving associated with the one or more component carrier power saving modes, such as a PDSCH configuration, a DCI configuration, a DMRS configuration, a TBS configuration, a BLER configuration, or a layer configuration, among other examples.

In a sixth operation 430, the UE may configure itself based at least in part on the communication state. In some aspects, the UE may configure the UE further based at least in part on additional signaling from the base station. For example, the base station may transmit, in addition to the indication of the communication state, an indication of one or more of the communication parameters associated with a PDSCH configuration, a DCI configuration, a DMRS configuration, a TBS configuration, a BLER configuration, or a layer configuration, among other examples.

The UE may communicate with the base station based at least in part on the power saving mode with the communication including monitoring a CORESET, receiving a downlink communication, or transmitting an uplink communication, among other examples. The UE may use one or more communication parameters to communicate with the base station based at least in part on the power saving mode. For example, the UE and the base station may configure a PDSCH, DCI, DMRSs, a TBS, a BLER, or layers of communications, among other examples, based at least in part on the power saving mode.

In a seventh operation 435, the UE may monitor for a CORESET based at least in part on the communication state. In some aspects, the UE may monitor the CORESET, including a search space set or a set of PDCCH candidates having parameters that are based at least in part on the power saving mode associated with the communication state.

In an eighth operation 440, the UE may receive, and the base station may transmit, a downlink communication based at least in part on the communication state. In some aspects, the UE may receive the downlink communication based at least in part on the UE and the base station applying levels of power saving to the downlink communication.

In a ninth operation 445, the UE may transmit, and the base station may receive, a downlink communication based at least in part on the communication state. In some aspects, the UE may transmit the uplink communication based at least in part on the UE and the base station applying levels of power saving to the uplink communication.

Based at least in part on the UE communication with the base station using one or more configurations associated with an active power saving mode, the UE and the base station may conserve power resources based at least in part on the base station operating in a power saving mode. Additionally or alternatively, the UE and the base station may conserve network communication, power, or computing resources that may have otherwise been used to indicate values of parameters associated with the periodic reference signals.

Figure 5:
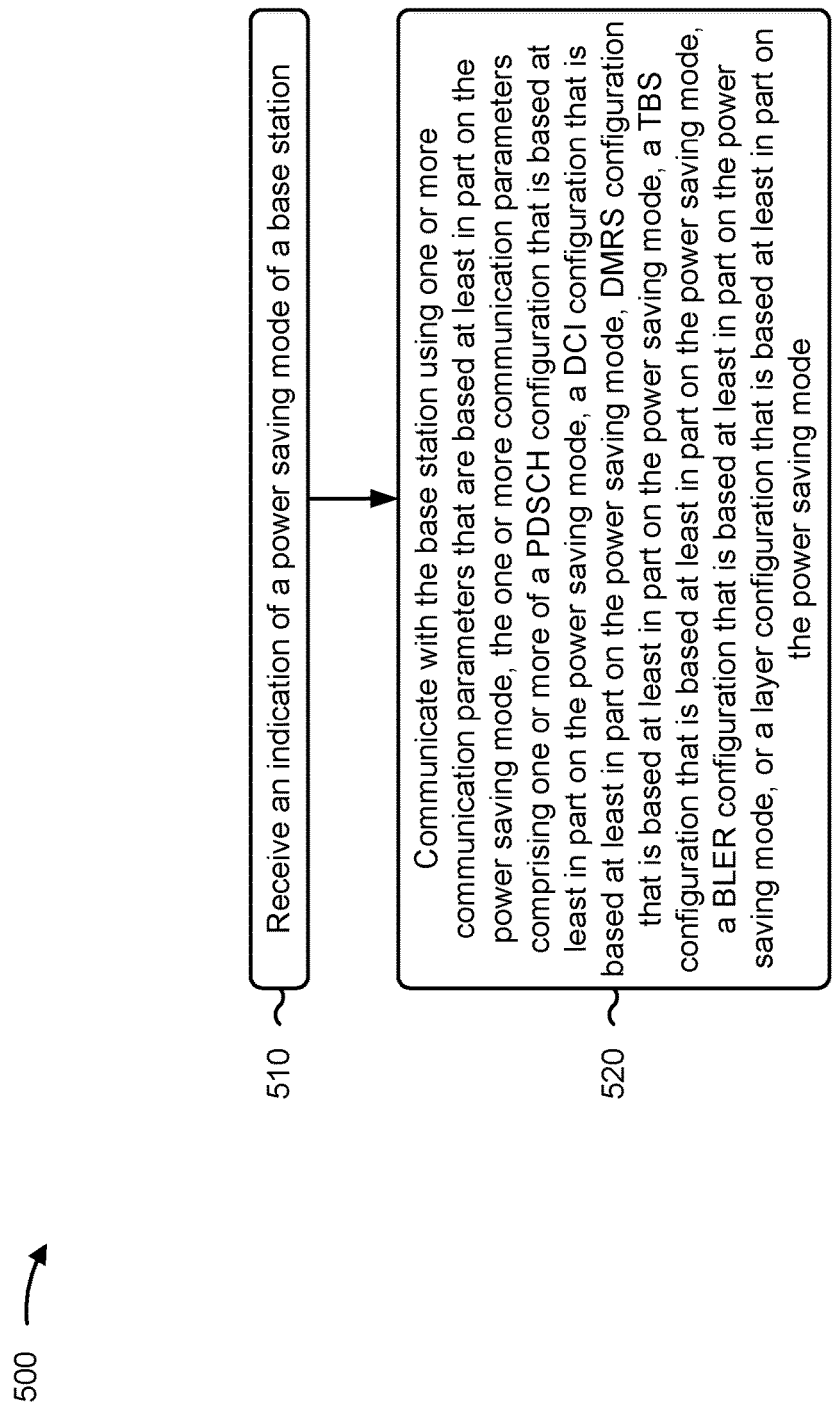
FIG. 5 is a flowchart illustrating an example process performed, for example, by a UE in accordance with the present disclosure.

FIG. 5 is a flowchart illustrating an example process 500 performed, for example, by a UE in accordance with the present disclosure. Example process 500 is an example where the UE (for example, UE 120) performs operations associated with communicating while in a power saving mode.

As shown in FIG. 5, in some aspects, process 500 may include receiving an indication of a power saving mode of a base station (block 510). For example, the UE (such as by using communication manager 140 or reception component 702, depicted in FIG. 7) may receive an indication of a power saving mode of a base station, as described above.

As further shown in FIG. 5, in some aspects, process 500 may include communicating with the base station using one or more communication parameters that are based at least in part on the power saving mode, the one or more communication parameters comprising one or more of: a PDSCH configuration that is based at least in part on the power saving mode, a DCI configuration that is based at least in part on the power saving mode, a DMRS configuration that is based at least in part on the power saving mode, a TBS configuration that is based at least in part on the power saving mode, a BLER configuration that is based at least in part on the power saving mode, or a layer configuration that is based at least in part on the power saving mode (block 520). For example, the UE (such as by using communication manager 140, reception component 702, or transmission component 704, depicted in FIG. 7) may communicate with the base station using one or more communication parameters that are based at least in part on the power saving mode, the one or more communication parameters comprising one or more of: a PDSCH configuration that is based at least in part on the power saving mode, a DCI configuration that is based at least in part on the power saving mode, a DMRS configuration that is based at least in part on the power saving mode, a TBS configuration that is based at least in part on the power saving mode, a BLER configuration that is based at least in part on the power saving mode, or a layer configuration that is based at least in part on the power saving mode, as described above.

Process 500 may include additional aspects, such as any single aspect or any combination of aspects described below or in connection with one or more other processes described elsewhere herein.

In a first additional aspect, process 500 includes receiving an indication to associate, with the power saving mode of the base station, the one or more communication parameters.

In a second additional aspect, alone or in combination with the first aspect, the PDSCH configuration is associated with one or more of a repetition number for communications with the base station, a change to the repetition number for the communications with the base station, one or more repetition numbers for one or more SPS-based communications with the base station, or cancelation of repetitions for one or more SPS-based communications with the base station.

In a third additional aspect, alone or in combination with one or more of the first and second aspects, the DCI configuration is associated with one or more of a control resource set to use to monitor for receiving a DCI message, a number of time-based resources of the control resource set, a number of frequency-based resources of the control resource set, one or more candidate aggregation levels for receiving the DCI message, a repetition number of the DCI message, disabling of repetitions of the DCI message, or a number of DCI messages transmitted in a multiple transmission reception point (multi-TRP) configuration.

In a fourth additional aspect, alone or in combination with one or more of the first through third aspects, the DMRS configuration is associated with one or more of an EPRE for transmitting DMRSs, a power offset between transmitting the DMRSs and transmitting data, replacement of one or more DMRS symbols with data symbols, frequency-domain density of the DMRSs, or activation or deactivation of DMRS bundling.

In a fifth additional aspect, alone or in combination with one or more of the first through fourth aspects, the communication parameters comprise one or more of a TRS configuration that is based at least in part on the power saving mode, or a PTRS configuration that is based at least in part on the power saving mode.

In a sixth additional aspect, alone or in combination with one or more of the first through fifth aspects, one or more of the TRS configuration or the PTRS configuration are associated with one or more of cancelation of TRSs, cancelation of PTRSs, a time-domain pattern of TRSs, a time-domain pattern of PTRSs, a frequency-domain pattern of TRSs, or a frequency-domain pattern of PTRSs.

In a seventh additional aspect, alone or in combination with one or more of the first through sixth aspects, the TBS configuration is associated with one or more of a fixed TBS that is based at least in part on the power saving mode, or a threshold TBS that is based at least in part on the power saving mode.

In an eighth additional aspect, alone or in combination with one or more of the first through seventh aspects, the communication parameters indicate one or more of a number of symbols in a slot for communications with the base station, a number of symbols in a sub-slot for communications with the base station, a number of resource blocks in a slot for communications with the base station, or a number of resource blocks in a sub-slot for communications with the base station.

In a ninth additional aspect, alone or in combination with one or more of the first through eighth aspects, the BLER configuration is associated with a target BLER that is based at least in part on the power saving mode.

In a tenth additional aspect, alone or in combination with one or more of the first through ninth aspects, the communication parameters comprise an MCS configuration that is based at least in part on the power saving mode, and wherein the MCS configuration is associated with one or both of MCS tables or a maximum MCS that is based at least in part on the power saving mode.

In an eleventh additional aspect, alone or in combination with one or more of the first through tenth aspects, the communication parameters comprise a re-transmission configuration that is based at least in part on the power saving mode, and wherein the re-transmission configuration is associated with one or more of a maximum re-transmission number that is based at least in part on the power saving mode, a maximum transmission number that is based at least in part on the power saving mode, or an RV sequence length that is based at least in part on the power saving mode.

In a twelfth additional aspect, alone or in combination with one or more of the first through eleventh aspects, the layer configuration is associated with one or more of a first maximum layer number that is based at least in part on the power saving mode, a second maximum layer number associated with a serving cell, the second maximum layer number being based at least in part on the power saving mode, or one or more third maximum layer numbers associated with one or more bandwidth parts, the one or more third maximum layer numbers being based at least in part on the power saving mode.

Although FIG. 5 shows example blocks of process 500, in some aspects, process 500 may include additional blocks, fewer blocks, different blocks, or differently arranged blocks than those depicted in FIG. 5. Additionally or alternatively, two or more of the blocks of process 500 may be performed in parallel.

Figure 6:
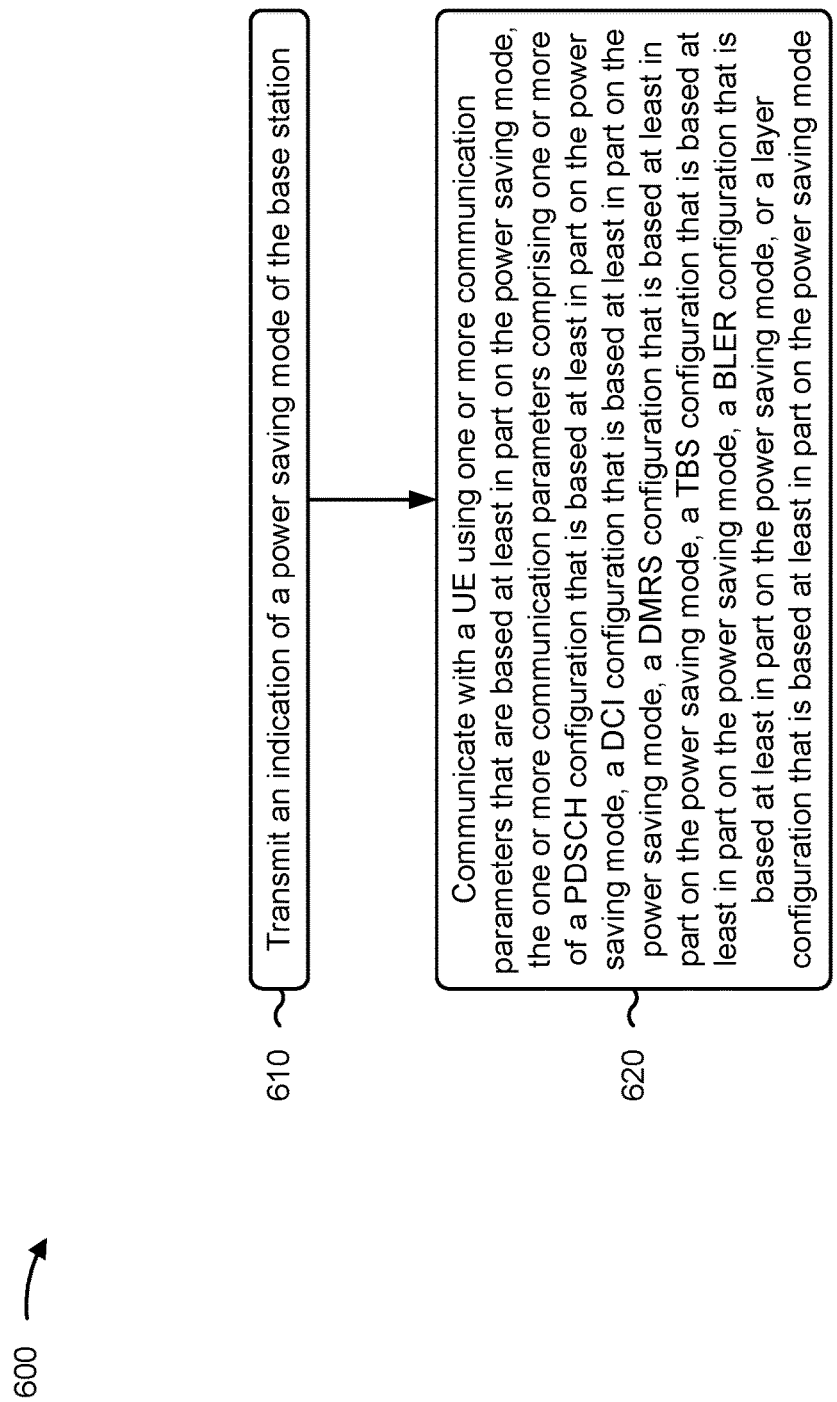
FIG. 6 is a flowchart illustrating an example process performed, for example, by a base station in accordance with the present disclosure.

FIG. 6 is a flowchart illustrating an example process 600 performed, for example, by a base station in accordance with the present disclosure. Example process 600 is an example where the base station (for example, base station 110) performs operations associated with communicating while in a power saving mode.

As shown in FIG. 6, in some aspects, process 600 may include transmitting an indication of a power saving mode of the base station (block 610). For example, the base station (such as by using communication manager 150 or transmission component 804, depicted in FIG. 8) may transmit an indication of a power saving mode of the base station, as described above.

As further shown in FIG. 6, in some aspects, process 600 may include communicating with a UE using one or more communication parameters that are based at least in part on the power saving mode, the one or more communication parameters comprising one or more of: a PDSCH configuration that is based at least in part on the power saving mode, a DCI configuration that is based at least in part on the power saving mode, a DMRS configuration that is based at least in part on the power saving mode, a TBS configuration that is based at least in part on the power saving mode, a BLER configuration that is based at least in part on the power saving mode, or a layer configuration that is based at least in part on the power saving mode (block 620). For example, the base station (such as by using communication manager 150, reception component 802, or transmission component 804, depicted in FIG. 8) may communicate with a UE using one or more communication parameters that are based at least in part on the power saving mode, the one or more communication parameters comprising one or more of: a PDSCH configuration that is based at least in part on the power saving mode, a DCI configuration that is based at least in part on the power saving mode, a DMRS configuration that is based at least in part on the power saving mode, a TBS configuration that is based at least in part on the power saving mode, a BLER configuration that is based at least in part on the power saving mode, or a layer configuration that is based at least in part on the power saving mode, as described above.

Process 600 may include additional aspects, such as any single aspect or any combination of aspects described below or in connection with one or more other processes described elsewhere herein.

In a first additional aspect, process 600 includes transmitting an indication to associate, with the power saving mode of the base station, the one or more communication parameters.

In a second additional aspect, alone or in combination with the first aspect, the PDSCH configuration is associated with one or more of a repetition number for communications with the base station, a change to the repetition number for the communications with the base station, one or more repetition numbers for one or more SPS-based communications with the base station, or cancelation of repetitions for one or more SPS-based communications with the base station.

In a third additional aspect, alone or in combination with one or more of the first and second aspects, the DCI configuration is associated with one or more of a control resource set to use to monitor for receiving a DCI message, a number of time-based resources of the control resource set, a number of frequency-based resources of the control resource set, one or more candidate aggregation levels for receiving the DCI message, a repetition number of the DCI message, disabling of repetitions of the DCI message, or a number of DCI messages transmitted in a multiple transmission reception point (multi-TRP) configuration.

In a fourth additional aspect, alone or in combination with one or more of the first through third aspects, the DMRS configuration is associated with one or more of an EPRE for transmitting DMRSs, a power offset between transmitting the DMRSs and transmitting data, replacement of one or more DMRS symbols with data symbols, frequency-domain density of the DMRSs, or activation or deactivation of DMRS bundling.

In a fifth additional aspect, alone or in combination with one or more of the first through fourth aspects, the communication parameters comprise one or more of a TRS configuration that is based at least in part on the power saving mode, or a PTRS configuration that is based at least in part on the power saving mode.

In a sixth additional aspect, alone or in combination with one or more of the first through fifth aspects, one or more of the TRS configuration or the PTRS configuration is associated with one or more of cancelation of TRSs, cancelation of PTRSs, a time-domain pattern of TRSs, a time-domain pattern of PTRSs, a frequency-domain pattern of TRSs, or a frequency-domain pattern of PTRSs.

In a seventh additional aspect, alone or in combination with one or more of the first through sixth aspects, the TBS configuration is associated with one or more of a fixed TBS that is based at least in part on the power saving mode, or a maximum TBS that is based at least in part on the power saving mode.

In an eighth additional aspect, alone or in combination with one or more of the first through seventh aspects, the communication parameters indicate one or more of a number of symbols in a slot for communications with the base station, a number of symbols in a sub-slot for communications with the base station, a number of resource blocks in a slot for communications with the base station, or a number of resource blocks in a sub-slot for communications with the base station.

In a ninth additional aspect, alone or in combination with one or more of the first through eighth aspects, the BLER configuration is associated with a target BLER that is based at least in part on the power saving mode.

In a tenth additional aspect, alone or in combination with one or more of the first through ninth aspects, the communication parameters comprise an MCS configuration that is based at least in part on the power saving mode, and wherein the MCS configuration is associated with one or both of MCS tables or a maximum MCS that is based at least in part on the power saving mode.

In an eleventh additional aspect, alone or in combination with one or more of the first through tenth aspects, the communication parameters comprise a re-transmission configuration that is based at least in part on the power saving mode, and wherein the re-transmission configuration is associated with one or more of a maximum re-transmission number that is based at least in part on the power saving mode, a maximum transmission number that is based at least in part on the power saving mode, or an RV sequence length that is based at least in part on the power saving mode.

In a twelfth additional aspect, alone or in combination with one or more of the first through eleventh aspects, the layer configuration is associated with one or more of a first maximum layer number that is based at least in part on the power saving mode, a second maximum layer number associated with a serving cell, the second maximum layer number being based at least in part on the power saving mode, or one or more third maximum layer numbers associated with one or more bandwidth parts, the one or more third maximum layer numbers being based at least in part on the power saving mode.

Although FIG. 6 shows example blocks of process 600, in some aspects, process 600 may include additional blocks, fewer blocks, different blocks, or differently arranged blocks than those depicted in FIG. 6. Additionally or alternatively, two or more of the blocks of process 600 may be performed in parallel.

Figure 7:
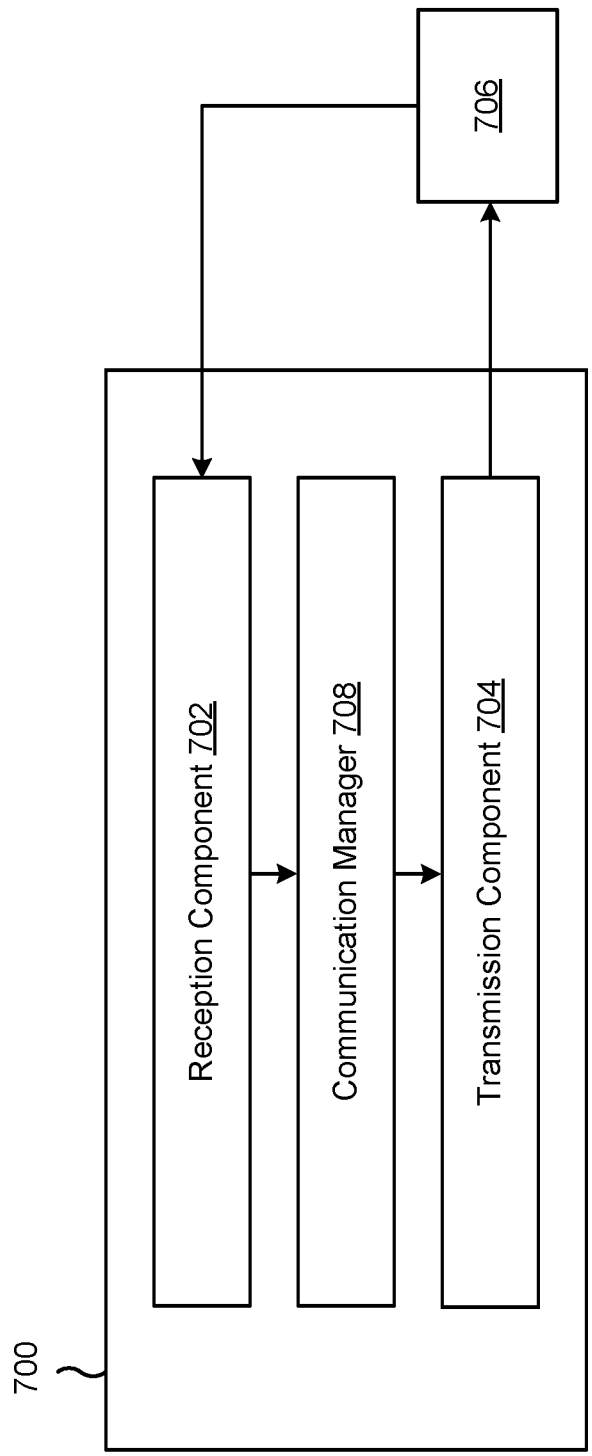
FIGS. 7 and 8 are diagrams of example apparatuses for wireless communication in accordance with the present disclosure.

FIG. 7 is a diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses or one or more other components). As shown, the apparatus 700 may communicate with another apparatus 706 (such as a UE, a base station, or another wireless communication device) using the reception component 702 and the transmission component 704. As further shown, the apparatus 700 may include a communication manager 708 (for example, the communication manager 140). In some aspects, the communication manager 708 may receive or provide instructions for communicating via the reception component 702 or the transmission component 704.

In some aspects, the apparatus 700 may be configured to perform one or more operations described herein in connection with FIG. 4. Additionally or alternatively, the apparatus 700 may be configured to perform one or more processes described herein, such as process 500 of FIG. 5. In some aspects, the apparatus 700 or one or more components shown in FIG. 7 may include one or more components of the UE described in connection with FIG. 2. Additionally or alternatively, one or more components shown in FIG. 7 may be implemented within one or more components described in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancelation, or decoding, among other examples), and may provide the processed signals to the one or more other components of the apparatus 700. In some aspects, the reception component 702 may include one or more antennas, a modem, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

The reception component 702 may receive an indication of a power saving mode of a base station. The reception component 702 or the transmission component 704 may communicate with the base station using one or more communication parameters that are based at least in part on the power saving mode, the one or more communication parameters comprising one or more of a PDSCH configuration that is based at least in part on the power saving mode, a DCI configuration that is based at least in part on the power saving mode, a DMRS configuration that is based at least in part on the power saving mode, a TBS configuration that is based at least in part on the power saving mode, a BLER configuration that is based at least in part on the power saving mode, or a layer configuration that is based at least in part on the power saving mode.

The reception component 702 may receive an indication to associate, with the power saving mode of the base station, the one or more communication parameters.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally or alternatively, a set of (one or more) components shown in FIG. 7 may perform one or more functions described as being performed by another set of components shown in FIG. 7.

Figure 8:
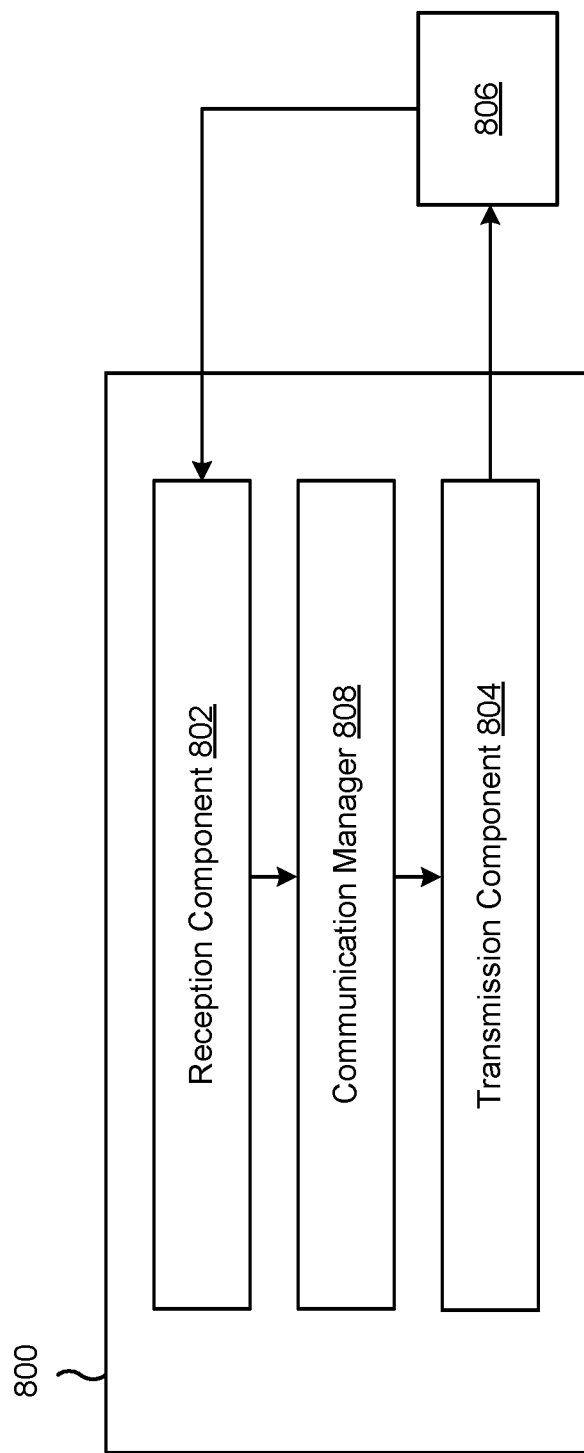

FIG. 8 is a diagram of an example apparatus 800 for wireless communication. The apparatus 800 may be a base station, or a base station may include the apparatus 800. In some aspects, the apparatus 800 includes a reception component 802 and a transmission component 804, which may be in communication with one another (for example, via one or more buses or one or more other components). As shown, the apparatus 800 may communicate with another apparatus 806 (such as a UE, a base station, or another wireless communication device) using the reception component 802 and the transmission component 804. As further shown, the apparatus 800 may include a communication manager 808 (for example, the communication manager 150). In some aspects, the communication manager 808 may receive or provide instructions for communicating via the reception component 802 or the transmission component 804.

In some aspects, the apparatus 800 may be configured to perform one or more operations described herein in connection with FIG. 4. Additionally or alternatively, the apparatus 800 may be configured to perform one or more processes described herein, such as process 600 of FIG. 6. In some aspects, the apparatus 800 or one or more components shown in FIG. 8 may include one or more components of the base station described in connection with FIG. 2. Additionally or alternatively, one or more components shown in FIG. 8 may be implemented within one or more components described in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancelation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the base station described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the base station described in connection with FIG. 2. In some aspects, the transmission component 804 may be co-located with the reception component 802 in a transceiver.

The transmission component 804 may transmit an indication of a power saving mode of the base station. The reception component 802 or the transmission component 804 may communicate with a UE using one or more communication parameters that are based at least in part on the power saving mode, the one or more communication parameters comprising one or more of a PDSCH configuration that is based at least in part on the power saving mode, a DCI configuration that is based at least in part on the power saving mode, a DMRS configuration that is based at least in part on the power saving mode, a TBS configuration that is based at least in part on the power saving mode, a BLER configuration that is based at least in part on the power saving mode, or a layer configuration that is based at least in part on the power saving mode.

The transmission component 804 may transmit an indication to associate, with the power saving mode of the base station, the one or more communication parameters.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: receiving an indication of a power saving mode of a base station; and communicating with the base station using one or more communication parameters that are based at least in part on the power saving mode, the one or more communication parameters comprising one or more of: a physical downlink shared channel (PDSCH) configuration that is based at least in part on the power saving mode, a downlink control information (DCI) configuration that is based at least in part on the power saving mode, a demodulation reference signal (DMRS) configuration that is based at least in part on the power saving mode, a transport block size (TBS) configuration that is based at least in part on the power saving mode, a block error rate (BLER) configuration that is based at least in part on the power saving mode, or a layer configuration that is based at least in part on the power saving mode.

Aspect 2: The method of Aspect 1, further comprising: receiving an indication to associate, with the power saving mode of the base station, the one or more communication parameters.

Aspect 3: The method of any of Aspects 1 or 2, wherein the PDSCH configuration is associated with one or more of: a repetition number for communications with the base station, a change to the repetition number for the communications with the base station, one or more repetition numbers for one or more semi-persistent-scheduling (SPS)-based communications with the base station, or cancelation of repetitions for one or more SPS-based communications with the base station.

Aspect 4: The method of any of Aspects 1-3, wherein the DCI configuration is associated with one or more of: a control resource set to use to monitor for receiving a DCI message, a number of time-based resources of the control resource set, a number of frequency-based resources of the control resource set, one or more candidate aggregation levels for receiving the DCI message, a repetition number of the DCI message, disabling of repetitions of the DCI message, or a number of DCI messages transmitted in a multiple transmission reception point (multi-TRP) configuration.

Aspect 5: The method of any of Aspects 1-4, wherein the DMRS configuration is associated with one or more of: an energy per resource element (EPRE) for transmitting DMRSs, a power offset between transmitting the DMRSs and transmitting data, replacement of one or more DMRS symbols with data symbols, frequency-domain density of the DMRSs, or activation or deactivation of DMRS bundling.

Aspect 6: The method of any of Aspects 1-5, wherein the communication parameters comprise one or more of a tracking reference signal (TRS) configuration that is based at least in part on the power saving mode, or a phase-tracking reference signal (PTRS) configuration that is based at least in part on the power saving mode.

Aspect 7: The method of Aspect 6, wherein one or more of the TRS configuration or the PTRS configuration are associated with one or more of: cancelation of TRSs, cancelation of PTRSs, a time-domain pattern of TRSs, a time-domain pattern of PTRSs, a frequency-domain pattern of TRSs, or a frequency-domain pattern of PTRSs.

Aspect 8: The method of any of Aspects 1-7, wherein the TBS configuration is associated with one or more of: a fixed TBS that is based at least in part on the power saving mode, or a threshold TBS that is based at least in part on the power saving mode.

Aspect 9: The method of any of Aspects 1-8, wherein the communication parameters indicate one or more of: a number of symbols in a slot for communications with the base station, a number of symbols in a sub-slot for communications with the base station, a number of resource blocks in a slot for communications with the base station, or a number of resource blocks in a sub-slot for communications with the base station.

Aspect 10: The method of any of Aspects 1-9, wherein the BLER configuration is associated with a target BLER that is based at least in part on the power saving mode.

Aspect 11: The method of any of Aspects 1-10, wherein the communication parameters comprise a modulation and coding scheme (MCS) configuration that is based at least in part on the power saving mode, and wherein the MCS configuration is associated with one or both of MCS tables or a maximum MCS that is based at least in part on the power saving mode.

Aspect 12: The method of any of Aspects 1-11, wherein the communication parameters comprise a re-transmission configuration that is based at least in part on the power saving mode, and wherein the re-transmission configuration is associated with one or more of: a maximum re-transmission number that is based at least in part on the power saving mode, a maximum transmission number that is based at least in part on the power saving mode, or a redundancy version (RV) sequence length that is based at least in part on the power saving mode.

Aspect 13: The method of any of Aspects 1-12, wherein the layer configuration is associated with one or more of: a first maximum layer number that is based at least in part on the power saving mode, a second maximum layer number associated with a serving cell, the second maximum layer number being based at least in part on the power saving mode, or one or more third maximum layer numbers associated with one or more bandwidth parts, the one or more third maximum layer numbers being based at least in part on the power saving mode.

Aspect 14: A method of wireless communication performed by a base station, comprising: transmitting an indication of a power saving mode of the base station; and communicating with a user equipment (UE) using one or more communication parameters that are based at least in part on the power saving mode, the one or more communication parameters comprising one or more of: a physical downlink shared channel (PDSCH) configuration that is based at least in part on the power saving mode, a downlink control information (DCI) configuration that is based at least in part on the power saving mode, a demodulation reference signal (DMRS) configuration that is based at least in part on the power saving mode, a transport block size (TBS) configuration that is based at least in part on the power saving mode, a block error rate (BLER) configuration that is based at least in part on the power saving mode, or a layer configuration that is based at least in part on the power saving mode.

Aspect 15: The method of Aspect 14, further comprising: transmitting an indication to associate, with the power saving mode of the base station, the one or more communication parameters.

Aspect 16: The method of any of Aspects 14 or 15, wherein the PDSCH configuration is associated with one or more of: a repetition number for communications with the base station, a change to the repetition number for the communications with the base station, one or more repetition numbers for one or more semi-persistent-scheduling (SPS)-based communications with the base station, or cancelation of repetitions for one or more SPS-based communications with the base station.

Aspect 17: The method of any of Aspects 14-16, wherein the DCI configuration is associated with one or more of: a control resource set to use to monitor for receiving a DCI message, a number of time-based resources of the control resource set, a number of frequency-based resources of the control resource set, one or more candidate aggregation levels for receiving the DCI message, a repetition number of the DCI message, disabling of repetitions of the DCI message, or a number of DCI messages transmitted in a multiple transmission reception point (multi-TRP) configuration.

Aspect 18: The method of any of Aspects 14-17, wherein the DMRS configuration is associated with one or more of: an energy per resource element (EPRE) for transmitting DMRSs, a power offset between transmitting the DMRSs and transmitting data, replacement of one or more DMRS symbols with data symbols, frequency-domain density of the DMRSs, or activation or deactivation of DMRS bundling.

Aspect 19: The method of any of Aspects 14-18, wherein the communication parameters comprise one or more of a tracking reference signal (TRS) configuration that is based at least in part on the power saving mode, or a phase-tracking reference signal (PTRS) configuration that is based at least in part on the power saving mode.

Aspect 20: The method of Aspect 19, wherein one or more of the TRS configuration or the PTRS configuration is associated with one or more of: cancelation of TRSs, cancelation of PTRSs, a time-domain pattern of TRSs, a time-domain pattern of PTRSs, a frequency-domain pattern of TRSs, or a frequency-domain pattern of PTRSs.

Aspect 21: The method of any of Aspects 14-20, wherein the TBS configuration is associated with one or more of: a fixed TBS that is based at least in part on the power saving mode, or a maximum TBS that is based at least in part on the power saving mode.

Aspect 22: The method of any of Aspects 14-21, wherein the communication parameters indicate one or more of: a number of symbols in a slot for communications with the base station, a number of symbols in a sub-slot for communications with the base station, a number of resource blocks in a slot for communications with the base station, or a number of resource blocks in a sub-slot for communications with the base station.

Aspect 23: The method of any of Aspects 14-22, wherein the BLER configuration is associated with a target BLER that is based at least in part on the power saving mode.

Aspect 24: The method of any of Aspects 14-23, wherein the communication parameters comprise a modulation and coding scheme (MCS) configuration that is based at least in part on the power saving mode, and wherein the MCS configuration is associated with one or both of MCS tables or a maximum MCS that is based at least in part on the power saving mode.

Aspect 25: The method of any of Aspects 14-24, wherein the communication parameters comprise a re-transmission configuration that is based at least in part on the power saving mode, and wherein the re-transmission configuration is associated with one or more of: a maximum re-transmission number that is based at least in part on the power saving mode, a maximum transmission number that is based at least in part on the power saving mode, or a redundancy version (RV) sequence length that is based at least in part on the power saving mode.

Aspect 26: The method of any of Aspects 14-25, wherein the layer configuration is associated with one or more of: a first maximum layer number that is based at least in part on the power saving mode, a second maximum layer number associated with a serving cell, the second maximum layer number being based at least in part on the power saving mode, or one or more third maximum layer numbers associated with one or more bandwidth parts, the one or more third maximum layer numbers being based at least in part on the power saving mode.

Aspect 27: An apparatus for wireless communication at a device, comprising a processor; memory coupled with the processor; and instructions stored in the memory and executable by the processor to cause the apparatus to perform the method of one or more of Aspects 1-26.

Aspect 28: A device for wireless communication, comprising a memory and one or more processors coupled to the memory, the one or more processors configured to perform the method of one or more of Aspects 1-26.

Aspect 29: An apparatus for wireless communication, comprising at least one means for performing the method of one or more of Aspects 1-26.

Aspect 30: A non-transitory computer-readable medium storing code for wireless communication, the code comprising instructions executable by a processor to perform the method of one or more of Aspects 1-26.

Aspect 31: A non-transitory computer-readable medium storing a set of instructions for wireless communication, the set of instructions comprising one or more instructions that, when executed by one or more processors of a device, cause the device to perform the method of one or more of Aspects 1-26.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, since those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A user equipment (UE) for wireless communication, comprising:
a processing system that includes one or more processors and one or more memories coupled with the one or more processors, the processing system configured to cause the UE to:
receive an indication of a power saving mode of a base station;
receive an indication to associate, with the power saving mode of the base station, a set of communication parameters; and
communicate with the base station using the set of communication parameters that are in accordance with the power saving mode of the base station, the set of communication parameters comprising two or more of:
a physical downlink shared channel (PDSCH) repetition configuration that is in accordance with the power saving mode of the base station,
a demodulation reference signal (DMRS) configuration that is in accordance with the power saving mode of the base station,
and
a layer configuration for one or more bandwidth parts in accordance with the power saving mode of the base station.

2. The UE of claim 1, wherein the PDSCH repetition configuration is in accordance with one or more of:
a repetition number for communications with the base station,
a change to the repetition number for the communications with the base station,
one or more repetition numbers for one or more semi-persistent-scheduling (SPS)-based communications with the base station, or
cancelation of repetitions for one or more SPS-based communications with the base station.

3. The UE of claim 1, wherein the set of communication parameters further comprise a DCI repetition configuration, wherein the DCI repetition configuration is in accordance with one or more of:
a control resource set to use to monitor for receiving one or more repetitions of a DCI message,
a number of time-based resources of the control resource set,
a number of frequency-based resources of the control resource set,
one or more candidate aggregation levels for receiving the DCI message,
a repetition number of the DCI message,
disabling of repetitions of the DCI message, or
a number of DCI messages transmitted in a multiple transmission reception point (multi-TRP) configuration.

4. The UE of claim 1, wherein the DMRS configuration is in accordance with one or more of:
an energy per resource element (EPRE) for transmitting DMRSs,
a power offset between transmitting the DMRSs and transmitting data,
replacement of one or more DMRS symbols with data symbols,
frequency-domain density of the DMRSs, or
activation or deactivation of DMRS bundling.

5. The UE of claim 1, wherein the set of communication parameters further comprise one or more of:
a tracking reference signal (TRS) configuration that is in accordance with the power saving mode of the base station, or
a phase-tracking reference signal (PTRS) configuration that is in accordance with the power saving mode of the base station.

6. The UE of claim 5, wherein one or more of the TRS configuration or the PTRS configuration are in accordance with one or more of:
cancelation of TRSs,
cancelation of PTRSs,
a time-domain pattern of TRSs,
a time-domain pattern of PTRSs,
a frequency-domain pattern of TRSs, or
a frequency-domain pattern of PTRSs.

7. The UE of claim 1, wherein the set of communication parameters further comprise a TBS configuration, wherein the TBS configuration is in accordance with one or more of:
a fixed TBS that is in accordance with the power saving mode of the base station, or
a threshold TBS that is in accordance with the power saving mode of the base station.

8. The UE of claim 1, wherein the set of communication parameters indicate one or more of:
a number of symbols in a slot for communications with the base station,
a number of symbols in a sub-slot for communications with the base station,
a number of resource blocks in a slot for communications with the base station, or
a number of resource blocks in a sub-slot for communications with the base station.

9. The UE of claim 1, wherein the set of communication parameters further comprise a BLER configuration, wherein the BLER configuration is in accordance with a target BLER that is in accordance with the power saving mode of the base station.

10. The UE of claim 1, wherein the set of communication parameters further comprise a modulation and coding scheme (MCS) configuration that is in accordance with the power saving mode of the base station, and
wherein the MCS configuration is in accordance with one or both of MCS tables or a maximum MCS that is in accordance with the power saving mode of the base station.

11. The UE of claim 1, wherein the set of communication parameters further comprise a re-transmission configuration that is in accordance with the power saving mode of the base station, and
wherein the re-transmission configuration is in accordance with one or more of:
a maximum re-transmission number that is in accordance with the power saving mode of the base station,
a maximum transmission number that is in accordance with the power saving mode of the base station, or
a redundancy version (RV) sequence length that is in accordance with the power saving mode of the base station.

12. The UE of claim 1, wherein the layer configuration is in accordance with one or more of:
a first maximum layer number that is in accordance with the power saving mode of the base station or a second maximum layer number in accordance with a serving cell, the second maximum layer number being in accordance with the power saving mode of the base station.

13. The UE of claim 1, wherein the set of communication parameters further comprise one or more of:
   a downlink control information (DCI) repetition configuration that is in accordance with the power saving mode of the base station,
   a transport block size (TBS) configuration that is in accordance with the power saving mode of the base station, or
   a block error rate (BLER) configuration that is in accordance with the power saving mode of the base station.

14. A base station for wireless communication, comprising:
   a processing system that includes one or more processors and one or more memories coupled with the one or more processors, the processing system configured to cause the base station to:
      transmit an indication of a power saving mode of the base station;
      transmit an indication to associate, with the power saving mode of the base station, a set of communication parameters; and
      communicate with a user equipment (UE) using the set of communication parameters that are in accordance with the power saving mode of the base station, the set of communication parameters comprising two or more of:
         a physical downlink shared channel (PDSCH) repetition configuration that is in accordance with the power saving mode of the base station,
         a demodulation reference signal (DMRS) configuration that is in accordance with the power saving mode of the base station,
         and
         a layer configuration for one or more bandwidth parts in accordance with the power saving mode of the base station.

15. The base station of claim 14, wherein the PDSCH repetition configuration is in accordance with one or more of:
   a repetition number for communications with the base station,
   a change to the repetition number for the communications with the base station,
   one or more repetition numbers for one or more semi-persistent-scheduling (SPS)-based communications with the base station, or
   cancelation of repetitions for one or more SPS-based communications with the base station.

16. The base station of claim 14, wherein the DCI repetition wherein the set of communication parameters further comprise a DCI repetition configuration, wherein the DCI repetition configuration is in accordance with one or more of:
   a control resource set to use to monitor for receiving one or more repetitions of a DCI message,
   a number of time-based resources of the control resource set,
   a number of frequency-based resources of the control resource set,
   one or more candidate aggregation levels for receiving the DCI message,
   a repetition number of the DCI message,
   disabling of repetitions of the DCI message, or
   a number of DCI messages transmitted in a multiple transmission reception point (multi-TRP) configuration.

17. The base station of claim 14, wherein the DMRS configuration is in accordance with one or more of:
   an energy per resource element (EPRE) for transmitting DMRSs,
   a power offset between transmitting the DMRSs and transmitting data,
   replacement of one or more DMRS symbols with data symbols,
   frequency-domain density of the DMRSs, or
   activation or deactivation of DMRS bundling.

18. The base station of claim 14, wherein the set of communication parameters further comprise one or more of:
   a tracking reference signal (TRS) configuration that is in accordance with the power saving mode of the base station, or
   a phase-tracking reference signal (PTRS) configuration that is in accordance with the power saving mode of the base station.

19. The base station of claim 18, wherein one or more of the TRS configuration or the PTRS configuration is in accordance with one or more of:
   cancelation of TRSs,
   cancelation of PTRSs,
   a time-domain pattern of TRSs,
   a time-domain pattern of PTRSs,
   a frequency-domain pattern of TRSs, or
   a frequency-domain pattern of PTRSs.

20. The base station of claim 14, wherein the set of communication parameters further comprise a TBS configuration, wherein the TBS configuration is in accordance with one or more of:
   a fixed TBS that is in accordance with the power saving mode of the base station, or
   a maximum TBS that is in accordance with the power saving mode of the base station.

21. The base station of claim 14, wherein the set of communication parameters indicate one or more of:
   a number of symbols in a slot for communications with the base station,
   a number of symbols in a sub-slot for communications with the base station,
   a number of resource blocks in a slot for communications with the base station, or
   a number of resource blocks in a sub-slot for communications with the base station.

22. The base station of claim 14, wherein the set of communication parameters further comprise a BLER configuration, wherein the BLER configuration is in accordance with a target BLER that is in accordance with the power saving mode of the base station.

23. The base station of claim 14, wherein the set of communication parameters further comprise a modulation and coding scheme (MCS) configuration that is in accordance with the power saving mode of the base station, and
   wherein the MCS configuration is in accordance with one or both of MCS tables or a maximum MCS that is in accordance with the power saving mode of the base station.

24. The base station of claim 14, wherein the set of communication parameters further comprise a re-transmission configuration that is in accordance with the power saving mode of the base station, and
   wherein the re-transmission configuration is in accordance with one or more of:
      a maximum re-transmission number that is in accordance with the power saving mode of the base station, a maximum transmission number that is in accordance with the power saving mode of the base station, or a redundancy version (RV) sequence length that is in accordance with the power saving mode of the base station.

25. The base station of claim 14, wherein the layer configuration is in accordance with one or more of:

a first maximum layer number that is in accordance with the power saving mode of the base station or a second maximum layer number in accordance with a serving cell, the second maximum layer number being in accordance with the power saving mode of the base station.

26. The base station of claim 14, wherein the set of communication parameters further comprise one or more of:

a downlink control information (DCI) repetition configuration that is in accordance with the power saving mode of the base station, a transport block size (TBS) configuration that is in accordance with the power saving mode of the base station, or a block error rate (BLER) configuration that is in accordance with the power saving mode of the base station.

27. A method of wireless communication performed by a user equipment (UE), comprising:

receiving an indication of a power saving mode of a base station;

receiving an indication to associate, with the power saving mode of the base station, a set of communication parameters; and communicating with the base station using the set of communication parameters that are in accordance with the power saving mode of the base station, the set of communication parameters comprising two or more of:

a physical downlink shared channel (PDSCH) repetition configuration that is in accordance with the power saving mode of the base station, a demodulation reference signal (DMRS) configuration that is in accordance with the power saving mode of the base station, and a layer configuration for one or more bandwidth parts in accordance with the power saving mode of the base station.

28. The method of claim 27, wherein the PDSCH repetition configuration is in accordance with one or more of:

a repetition number for communications with the base station, a change to the repetition number for the communications with the base station, one or more repetition numbers for one or more semi-persistent-scheduling (SPS)-based communications with the base station, or cancelation of repetitions for one or more SPS-based communications with the base station.

29. The method of claim 27, wherein the DMRS configuration is in accordance with one or more of:

an energy per resource element (EPRE) for transmitting DMRSs, a power offset between transmitting the DMRSs and transmitting data, replacement of one or more DMRS symbols with data symbols, frequency-domain density of the DMRSs, or activation or deactivation of DMRS bundling.

30. A method of wireless communication performed by a base station, comprising:

transmitting an indication of a power saving mode of the base station;

transmitting an indication to associate, with the power saving mode of the base station, a set of communication parameters; and communicating with a user equipment (UE) using the one or more communication parameters that are in accordance with the power saving mode of the base station, the set of communication parameters comprising two or more of:

a physical downlink shared channel (PDSCH) repetition configuration that is in accordance with the power saving mode of the base station, a demodulation reference signal (DMRS) configuration that is in accordance with the power saving mode of the base station, and a layer configuration for one or more bandwidth parts in accordance with the power saving mode of the base station.

* * * * *